United States Patent [19]
Haarasilta

[11] Patent Number: 4,564,524
[45] Date of Patent: Jan. 14, 1986

[54] FODDER AND PROCESS FOR PRODUCTION THEREOF

[75] Inventor: Asko Haarasilta, Helsinki, Finland

[73] Assignee: Vaasanmylly Oy, Helsinki, Finland

[21] Appl. No.: 495,683

[22] Filed: May 18, 1983

[51] Int. Cl.$^4$ ............................................... A23K 1/00
[52] U.S. Cl. ..................................... 426/74; 426/635; 426/636; 426/807
[58] Field of Search ............... 426/2, 74, 623, 630, 426/636, 807, 658, 635

[56] References Cited

U.S. PATENT DOCUMENTS

| | | | |
|---|---|---|---|
| 2,905,558 | 9/1959 | Adams | 426/807 X |
| 2,965,488 | 12/1960 | Belasco | 426/69 |
| 3,246,336 | 4/1966 | Baribo et al. | 426/658 X |
| 3,532,503 | 10/1970 | Kuiesitis | 426/807 X |
| 3,619,200 | 11/1971 | Ferguson | 426/807 X |
| 3,873,728 | 3/1975 | Moore | 426/807 X |
| 4,349,578 | 9/1982 | Wright et al. | 426/635 X |

FOREIGN PATENT DOCUMENTS 2217956 10/1972 Fed. Rep. of Germany .

OTHER PUBLICATIONS

"Digestive Physiology and Nutrition of Ruminants", vol. 1, D. C. Church.

Primary Examiner—R. B. Penland
Attorney, Agent, or Firm—Fleit, Jacobson, Cohn & Price

[57] ABSTRACT

A coarse ruminant feedstuff having a stabilized granular consistency and a process for producing same in which, as a stabilizing component, the fodder or feed granules contain a binder so that the stability and consistency of granules without decomposing in rumen conditions is at least 1 hour, preferably 1-4 hours in order to stimulate the rumen to mechanical action. Said binder can be polymerized, such as a resin or a plastic compound. The binder preferably is colophonium and possibly also contains a physiologically tolerable inorganic salt, such as a sulphate, a carbonate and/or a phosphate. The binder can further contain a physiologically tolerable oil. As its main component, the feed or fodder can contain e.g. straw, sawdust and/or wood chips.

4 Claims, No Drawings

FODDER AND PROCESS FOR PRODUCTION THEREOF

The present invention relates to a fodder, intended mainly for cattle, said fodder or feed containing nutrients and possibly trace elements, such as protein, carbohydrates, minerals and/or vitamins. In particular, the invention is directed to a whole fed intended for ruminants and having a coarse feed activity. The invention further relates to a process for the preparation of fodder, wherein a feed composition is granulated into feed granules by extruding the composition under pressure through a matrix.

The term whole feed is intended to mean a feed or fodder that contains proteins and carbohydrates, such as grain, and trace elements, such as minerals and vitamins. Such whole feed is sufficient to satisfy the feed demand of ruminants. It is an inevitable fact that ruminants need coarse feed, such as hay and/or straw, which is necessary for ruminants for the proper action or rumen. Coarse feed has a mechanical effect in the rumen and coarse feed stimulates the rumen mechanically, bringing about the rumination action. Rumination produces a lot of saliva and the sodium contained in saliva maintains the buffer action of rumen juice. The action of rumen appears as the decomposing activity of microbes, a cellulose containing coarse feed, such as hay and straw, mainly decomposing into acetic and propionic acid as well as into lactic acid and valeric acid. A ruminant can satisfy its energy demand and most of its protein demand through microbial activity. The presently known whole feeds are not capable of starting the microbial activity of rumen and, thus, the known whole feeds are incapable of satisfying the coarse feed demand of a ruminant.

The amounts of acetic acid and propionic acid as well as those of other decomposition products produced in the rumen of a ruminant as a result of microbial activity must be within certain limits and in a certain relationship to each other. If a ruminant is not given coarse feed, the acceptable limits of volatile fatty acids formed in rumen are exceeded, which leads to metabolic trouble.

With highly productive cows, the microbial activity alone is not capable of fulfilling the entire protein demand. Some of the necessary protein is obtained from nutrients directly into the intestinal canal without the rumen decomposing them. Passing of protein directly into the intestinal canal has been aimed to improve by protein protection methods, whereby e.g. formaldehyde or tannin is added into the feed. Also known is the protective activity of fats, e.g. soya seed, the fat in a feed decreasing the decomposition of protein in rumen and increasing the direct passing of protein into intestinal canal.

Production of coarse feed or fodder, such as hay, involves a lot of work and is thus relatively expensive. Furthermore, the production of hay is difficult to rationalize, especially in the quickly-changing weather conditions of Finland and in the changing farming and production conditions.

An object of the present invention is to provide a whole feed which is suitable for ruminants. A particular object of the invention is to provide a whole feed which stimulates rumination and makes the rumen of ruminants work so that separate coarse feed is not required. A further object of the invention is to provide a whole feed which completely satisfies the feed demand of ruminants, especially neats and even highly productive milk cows as well as cattle. An object of the invention is still to provide a whole feed whose production does not involve so much labor and can be readily produced industrially in a feed plant. Still another object of the invention is to provide a novel, e.g. straw-based whole feed in which the energy value of straw or other cellulose containing raw material is better than before. Still another object of the invention is to provide a rich and no grain containing fodder for cattle. An object of the invention is also to provide a process for the production of such whole feed or fodder.

As for the characterizing features of the invention, reference is made to the annexed claims.

The invention is based on the fact that the feed or fodder contains granules which travel into the rumen and stimulate it the same way as conventional coarse feed or fodder and initiate the action of rumen. According to the invention, the granules are mechanically so stable that they can withstand the conditions in rumen without decomposing for at least 1 hour, preferably 1-4 hours. Stability of the granules, i.e., the stabilized granular consistency of the coarse ruminant feedstuff, is of essential significance since the mechanical stimulation of rumination by the granules in the rumen is not sufficient until after 1-4 hours, preferably several hours.

Upon decomposing, granules will be subjected to digestive juices of a ruminant and the ruminant exploits the nutrients contained in feed or fodder.

The stability of feed grains according to the invention can be achieved by means of any per se known non-toxic, physiologically tolerable binder that fulfils the necessary requirements, such as polymerizable resins, plastics etc. Particularly exploitable stabilizing agents are by-products obtained from wood-processing industry, especially because of their ready availability and cheap price. Available agents include e.g. tall oil, the resinous ingredients of tall oil, such as colophonium, lignosulphonate derivates, alkaliligin derivatives etc. The concentrations of a stabilizer can vary e.g. within the range of 1-10% by weight, with colophonium suitably 4-10% by weight, preferably circa 5% by weight.

The stabilized core of such rumen stimulating granules preferably consists of cellulose-based natural products, such as straw, wood chips: so-called cutter dust i.e. sawdust, wheat bran, oat hulls, grain hulls in general, thresher leftovers etc. If desired, it is also possible to use hay, feed grain, molasses, fat, ingredients of oleiferous plants, oil etc., which are generally known in conjunction with feed production. A particularly preferable raw material for a coarse feed active fodder or feed of the invention comprises straw because of its relatively economical price and high energy value, especially a chemically processed straw. Straw or some other cellulose containing ingredient of such feed is utilized in a suitably ground form, the size being e.g. 0.5-1-2 cm.

Particularly preferable additives in feed production are physiologically tolerable oils, such as linseed oil, soya bean oil, turnip rape oil, paraffin oil etc. In the granulation step, e.g. in a collar-type of feed granulator or extruder, said oil produces on the granule surface a hard and sleek as well as a dissolution resistant layer, which further resistants the decomposition of granules in rumen. The amount of oil is preferably over 0.5% by weight, e.g. 0.5-2.0% by weight; of course, a higher content is not detrimental either.

A further assistance to the formation of a stable, rumen conditions resisting granules is offered by inorganic salts. Added in the feed can be e.g. sulphate, carbonate, phosphate or the like physiologically tolerable cations and e.g. Na—, Ca— or the like alkali or alkali earth ions.

In order to completely satisfy the feed or fodder demand of a ruminant, the feed granules of a fodder of the invention may contain a stabilized, rumen action stimulating core, coated with rich fodder. Correspondingly, said granules may contain a rumen action stimulating, stabilized hull layer as well as a core consisting of rich fodder.

Fodder of the invention can be produced by the prior art feed production processes by stabilizing the feed in conjunction with granulation in a manner that the granules have required stability and resistance to decomposition in rumen conditions. The fodder can be produced by extruding a feed composition under pressure through a matrix incorporating a binder therein which binder is polymerized in conjunction with the formation of the composition. It is further possible to use a feed composition that contains stabilized, rumen acton stimulating granules and, in addition to that, conventional rich fodder as separate granules or ingredients.

The invention shall now be described in detail in conjunction with the following work examples.

EXAMPLE 1

A fodder of the invention, having a coarse feed activity, was prepared by means of a conventional collar-type feed granulator. Composition of the feed is presented in Table 1. The fodder was fed to test animals together with a basic rich or concentrated fodder, the composition being shown in Table 1. Test animals in animal tests included 16 head of cattle, live weight 140-160 kg, divided into 4 groups, 4 animals in each, as well as 4 fistulated animals, live weight 320-370 kg, divided into 2 groups, 2 animals in each. The control animals (normal animals and fistulated) were given 90% of basic rich fodder and 10% of the test feed of the invention. In the basic feed, the animals received 24 g of dry matter per 1 kg of live weight for 12 weeks. Feed consumption was controlled every day and live weight every four weeks.

Test results are shown in Tables 2, 3, 4, 5 and 6.

It can be noted on the basis of the results that the daily extra growth was the same with both feedings and the efficiency of feed was better with the test group than with the group receiving chopped straw as coarse feed. pH was a bit lower with the test group but remained within the safe limits for the action of rumen. The amount of total fatty acids was higher in the test group than in the control group. The acetic acid content was lower in the test group but the propionic acid content was higher than in the control group. The amount of valeric and caproic acids was lower in the test group than in the control group. This indicated that protein synthesis in rumen may be higher in the test group than in the control group.

Digestibility of the dry matter, gross energy of the organic matter and that of the fat was higher in the test group of fistulated animals. This explains why normal animals were found to have better feed exploitation. Only the fiber digestibility was lower with test feed; this, on the other hand, is related to the lower fiber amount of test feeding. It is quite normal that the fiber digestibility improves as the amount of fiber increases in feeding.

EXAMPLE 2

A feed was prepared in one test by using cutter chips 81%, molasses cut 3.0%, colophonium 5.0%, linseed oil 0.5%, sodium persulphate 0.5% and meatbone feed meal 10.0%. First prepared was a premix (a) by using half of the meatbone feed meal, all colophonium, sodium persulphate and linseed oil, as well as a premix (b) by using the cutter chips and molasses cut, said mixes (a) and (b) being then blended together. The mixture was granulated as in Example 1. The process was repeated by substituting 1. straw and 2. oat hulls for cutter chips.

EXAMPLE 3

One study involved a series of tests. First prepared were a variety of granulated feeds, the compositions being shown in Table 7. The compositions were granulated as in Examples 1-2. The granulated products were sampled and the samples were placed in water vessels. The insoluble grains were screened out of the first vessels after ½ hour and photographed. The same was repeated from the following vessels after 1, 2 and 3 hours. Test results indicated that mixtures 5 and 6 dissolved quicker than mixture 4 chemicals and linseed oil improve the dissolution resistance of a granule substitution of powdered milk for molasses cut impairs the dissolution resistance powered milk cannot be substituted for chemicals and linseed oil; addition of colophonium does not help in this sense.

EXAMPLE 4

One study involved solubility tests. First prepared were feed mixtures by using (1) cutter chips (moist. 10%) 80.0%, water 10%, powdered milk made of skimmed milk 1.0%, colophonium 5.0%, $CaCO_3$ 3.0% and paraffin 2.0% as well as (2) sawdust (moist. 10%) 91.0%, powdered milk 1.0%, colophonium 5.0%, $CaCO_3$ 3.0-5.0%, paraffin 0.5-1.0%. The mixtures were granulated as in Example 1 and the granulated products were tested for solubility as in Example 3. All products resisted dissolution for over 3 hours.

TABLE 1

| | Feed ingredients: | | | | | | |
|---|---|---|---|---|---|---|---|
| | barley | straw | oat hull | turnip rape oil | soya flour | meatbone feed | urea | bicalcium phosphate |
| wt % | 44,5 | 20 | 10 | 8 | 8,5 | 5 | 1,0 | 1,0 |
| calcium carbonate | | premix 1,0 | | | | | | |

| | Feed analysis: | | | | |
|---|---|---|---|---|---|
| | dry matter | organic matter | raw protein | hydrolysated fat | raw fiber | raw energy |
| wt % | 87,7 | 81,6 | 14,5 | 7,9 | 12,8 | 4030 kcal/kg |

| | Test feed: | | | | | |
|---|---|---|---|---|---|---|
| | cutter chip moist. 10% | water | powdered milk | colophonium | calcium carbonate | paraffin |
| wt % | 81 | 8,0 | 1,0 | 5,0 | 3,0 | 2,0 |

TABLE 2

| | non-fistulated animals, in vivo results | | | | | |
|---|---|---|---|---|---|---|
| | straw feed | | | test feed | | |
| Animals Groups | group 1 | group 2 | x̄ | group 1 | group 2 | x̄ |
| Step 0 (28 days) | | | | | | |
| weigh/day (g) | 1143 | 1701 | 1107 | 732 | 759 | 746 |
| IC | 3.808 | 3.998 | 3.903 | 5.629 | 5.513 | 5.571 |
| Step 1 (28 days) | | | | | | |
| weigh/day (g) | 1098 | 991 | 1045 | 1223 | 1089 | 1156 |
| IC | 4.634 | 5.135 | 4.885 | 3.814 | 4.283 | 4.049 |
| Step 2 (28 days) | | | | | | |
| weigh/day (g) | 1527 | 1366 | 1447 | 1277 | 1330 | 1304 |
| IC | 4.836 | 4.902 | 4.869 | 4.808 | 4.614 | 4.711 |
| Step 3 (28 days) | | | | | | |
| weigh/day (g) | 1009 | 1063 | 1036 | 1080 | 1089 | 1085 |
| IC | 7.136 | 6.773 | 6.955 | 6.111 | 6.061 | 6.086 |
| Step 4 (28 days) | | | | | | |
| weigh/day (g) | 1071 | 1241 | 1156 | 1161 | 1095 | 1128 |
| IC | 6.805 | 5.873 | 6.339 | 5.761 | 6.108 | 5.935 |
| Step 5 (28 days) | | | | | | |
| weigh/day (g) | 1161 | 1063 | 1112 | 1009 | 952 | 981 |
| IC | 6.536 | 7.138 | 6.837 | 6.888 | 7.300 | 7.094 |
| Step 6 (28 days) | | | | | | |
| weigh/day (g) | 884 | 679 | 781 | 1188 | 1262 | 1225 |
| IC | 9.219 | 12.003 | 10.611 | 6.343 | 5.971 | 6.157 |
| Step 7 (28 days) | | | | | | |
| weigh/day (g) | 821 | 777 | 799 | 813 | 726 | 770 |
| IC | 10.536 | 11.133 | 10.834 | 9.914 | 11.102 | 10.508 |
| Steps 1-7 (196 days) | | | | | | |
| weigh/day (g) | 1082 | 1026 | 1054 | 1107 | 1054 | 1081 |
| IC | 6.689 | 7.054 | 6.871 | 6.018 | 6.321 | 6.170 |
| Steps 0-7 (224 days) | | | | | | |
| weigh/day (g) | 1089 | 1031 | 1060 | 1060 | 1007 | 1034 |
| IC | 6.314 | 6.660 | 6.487 | 5.985 | 6.398 | 6.147 |

TABLE 3 non-fistulated animals, individual in vivo results

| animal no. | start weight (kg) | end weight (kg) | day | weight/day (kg) |
|---|---|---|---|---|
| Group A (straw feeding) | | | | |
| 286 | 182 | 410 | 196 | 1.163 |
| 282 | 183 | 417 | 223 | 1.049 |
| 281 | 166 | 416 | 196 | 1.276 |
| 296 | 166 | 342 | 224 | 0.786 |
| 288 | 170 | 409 | 223 | 1.072 |
| 289 | 180 | 420 | 223 | 1.076 |
| 287 | 173 | 430 | 223 | 1.152 |
| 293 | 153 | 344 | 224 | 0.853 |
| Group B (test feeding) | | | | |
| 250 | 168 | 367 | 224 | 0.888 |
| 300 | 167 | 403 | 216 | 1.093 |
| 298 | 181 | 423 | 196 | 1.235 |
| 295 | 180 | 404 | 196 | 1.143 |
| 299 | 183 | 391 | 216 | 0.963 |
| 284 | 178 | 412 | 216 | 1.083 |
| 283 | 189 | 348 | 110 | 1.445 |
| 285 | 175 | 403 | 216 | 1.056 |
| x̄ | 177,6 | 393,9 | 198,8 | 1.088 |
| x̄ without animal No. 283 | 176,0 | 400,4 | 211,4 | 1.061 |

TABLE 4 fistulated animals, pH and VFA in rumen juice

| Time after feeding (h) | feed | whole VFA mM/l | $C_2$ rel. % | $C_3$ rel. % | $iC_4$ rel. % | $C_4$ rel. % | $iC_5$ rel. % | $C_5$ rel. % | $C_6$ rel. % | pH |
|---|---|---|---|---|---|---|---|---|---|---|
| 0 | A | 27.2 | 67.6 | 19.2 | 2.81 | 5.38 | 1.20 | 0.00 | 0.00 | 7.5 |
| | B | 22.8 | 66.4 | 18.4 | 3.30 | 5.77 | 4.51 | 1.60 | 0.00 | 7.5 |
| 1 | A | 51.3 | 67.6 | 20.7 | 1.29 | 7.21 | 1.72 | 1.37 | 0.00 | 7.2 |
| | B | 50.6 | 67.0 | 21.1 | 1.07 | 7.52 | 1.60 | 1.45 | 0.31 | 7.2 |
| 2 | A | 73.8 | 64.3 | 24.8 | 0.78 | 7.44 | 1.06 | 1.45 | 0.00 | 6.9 |
| | B | 70.8 | 63.3 | 25.0 | 0.61 | 8.00 | 1.10 | 1.72 | 0.36 | 6.9 |
| 4 | A | 107.9 | 60.7 | 29.4 | 0.36 | 7.57 | 0.71 | 1.13 | 0.00 | 6.1 |
| | B | 123.0 | 57.5 | 29.6 | 0.32 | 9.32 | 0.93 | 1.87 | 0.52 | 6.0 |
| 8 | A | 97.4 | 60.1 | 29.1 | 0.59 | 7.42 | 1.19 | 1.33 | 0.09 | 6.6 |
| | B | 100.2 | 55.3 | 30.1 | 0.61 | 9.21 | 1.71 | 2.35 | 0.83 | 6.4 |

TABLE 5 fistulated animals, digestibility of nutrients

| Feeding sample no. | average % | organic matter % | fiber % | energy % | hydrolysated fat % |
|---|---|---|---|---|---|
| 1 | 62,2 | 64,2 | 33,4 | 62,3 | 69,3 |
| 2 | 61,7 | 64,1 | 35,3 | 62,7 | 72,7 |
| 3 | 62,0 | 63,7 | 33,8 | 62,0 | 77,3 |
| 4 | 66,9 | 67,9 | 38,3 | 66,9 | 76,4 |
| x̄ | 63,2 | 65,0 | 35,2 | 63,5 | 73,9 |
| 1 | 65,6 | 67,4 | 31,2 | 65,9 | 78,8 |
| 2 | 63,5 | 66,2 | 28,0 | 64,0 | 80,0 |
| 3 | 63,0 | 64,8 | 30,8 | 63,5 | 79,1 |
| 4 | 64,0 | 65,2 | 27,4 | 64,2 | 78,3 |
| x̄ | 64,0 | 65,9 | 29,4 | 64,4 | 79,1 |

TABLE 6

| animal no. | live weight/kg | carcass weight/kg | carcass weight/ live weight (%) |
|---|---|---|---|
| Group A (straw feeding) | | | |
| 286 | 425 | 227 | 53,4 |
| 282 | 417 | 227 | 54,4 |
| 281 | 426 | 227 | 53,3 |
| 288 | 409 | 229,5 | 56,1 |
| 289 | 420 | 231 | 55,0 |
| 287 | 430 | 237 | 55,1 |
| x̄ | 421 | 230 | 54,6 |
| Group B (test feeding) | | | |
| 300 | 403 | 233 | 57,8 |
| 298 | 438 | 230 | 53,7 |
| 295 | 411 | 224 | 54,5 |
| 299 | 391 | 215,5 | 55,1 |
| 284 | 412 | 225 | 54,6 |
| 285 | 403 | 227 | 56,3 |
| x̄ | 408 | 226 | 55,3 |

TABLE 7

| Composition no. | solubility tests | | | | | | | | |
|---|---|---|---|---|---|---|---|---|---|
| | 0 | 1 | 2 | 3 | 4 | 5 | 6 | 7 | 8 |
| Cutter chip | 80 | | 80 | 81 | 85 | 86 | 87 | 83 | 78 |
| Molasses cut-bran mixture | 4 | 4 | 4 | | | | | | |

TABLE 7-continued

| Composition no. | solubility tests | | | | | | | | |
|---|---|---|---|---|---|---|---|---|---|
| | 0 | 1 | 2 | 3 | 4 | 5 | 6 | 7 | 8 |
| colophonium | 5 | 5 | 5 | 5 | 5 | 4 | 3 | 5 | 10 |
| linseed oil | 0,5 | 0,5 | 0,5 | 0,5 | | | | | |
| sodium hydrogen sulphate | 0,5 | 0,5 | 0,5 | 0,5 | | | | | |
| meatbone feed meal | 10 | 10 | | | | | | | |
| barley | | | 10 | 10 | 10 | 10 | 10 | 10 | 10 |
| powdered milk | | | | 3 | | | | 2 | 2 |
| turnip rape oil | | 1,5 | | | | | | | |
| oat hull | | 78,5 | | | | | | | |

Contents of the ingredients have been reported as weight percent.

I claim:

1. A process for producing a coarse ruminant feedstuff having a stabilized granular consistency, said process comprising:
   a. preparing a feed composition comprising one or more cellulose-containing materials selected from the group consisting of straw, sawdust and wood chips in an amount of from 50 to 92% by weight and from 4 to 10% by weight of polymerizable colophonium for stabilizing the granular consistency of said feedstuff under rumen conditions to thereby mechanically stimulate rumination;
   b. extruding said feed composition under pressure to thereby polymerize said polymerizable colophonium and granulate said feed composition into a coarse ruminant feedstuff having a stabilized granular consistency.

2. A process according to claim 1, wherein the feed composition further comprises from 0.3 to 3% by weight of a physiologically tolerable inorganic salt having a anion selected from the group consisting of a sulphate, a carbonate, and a phosphate combined with an alkali or alkali earth ion.

3. A process according to claim 1, wherein the feed composition further comprises from 0.3 to 8% by weight of a physiologically tolerable oil.

4. A process according to claim 1, wherein the feed composition further comprises molasses.